Jan. 31, 1967

C. E. PALMER 3,301,143

METHOD AND APPARATUS FOR FOLDING CONTAINERS HAVING
A WINDOW OF SYNTHETIC PLASTIC SHEET MATERIAL

Filed Dec. 26, 1963

INVENTOR.
CHARLES E. PALMER

BY
Peter L. Costas

ATTORNEY

Jan. 31, 1967   C. E. PALMER   3,301,143
METHOD AND APPARATUS FOR FOLDING CONTAINERS HAVING
A WINDOW OF SYNTHETIC PLASTIC SHEET MATERIAL
Filed Dec. 26, 1963   3 Sheets-Sheet 2
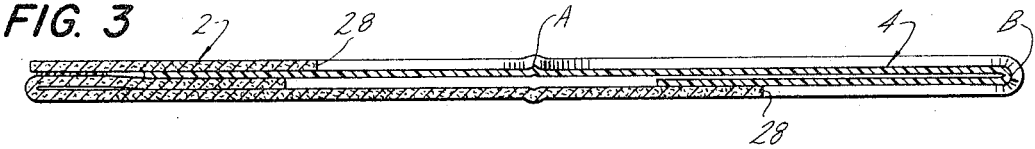
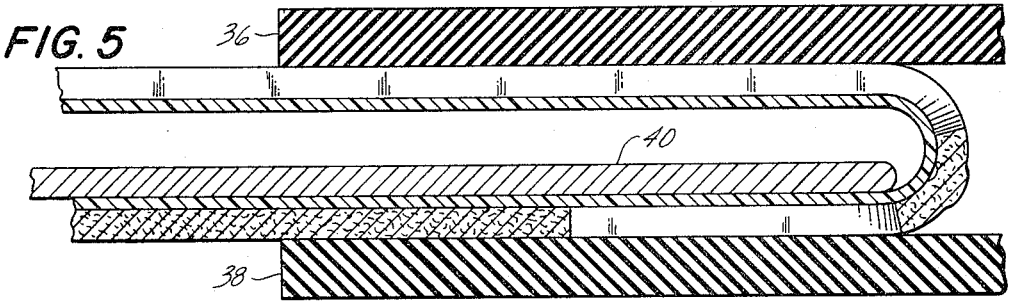
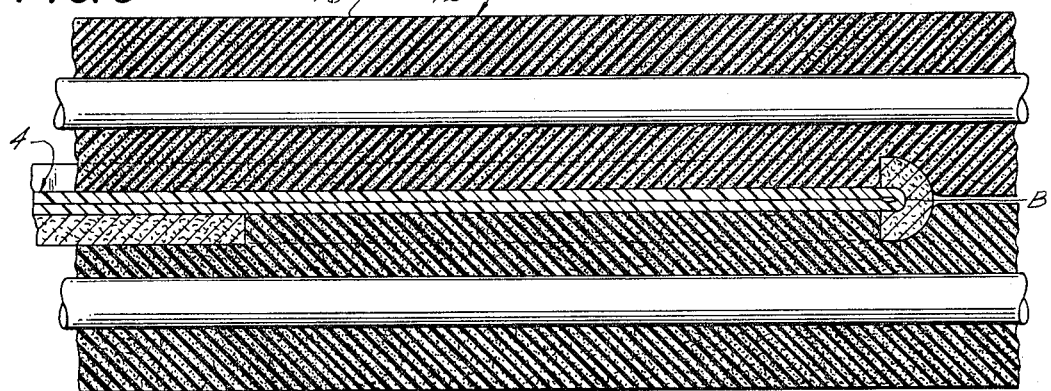
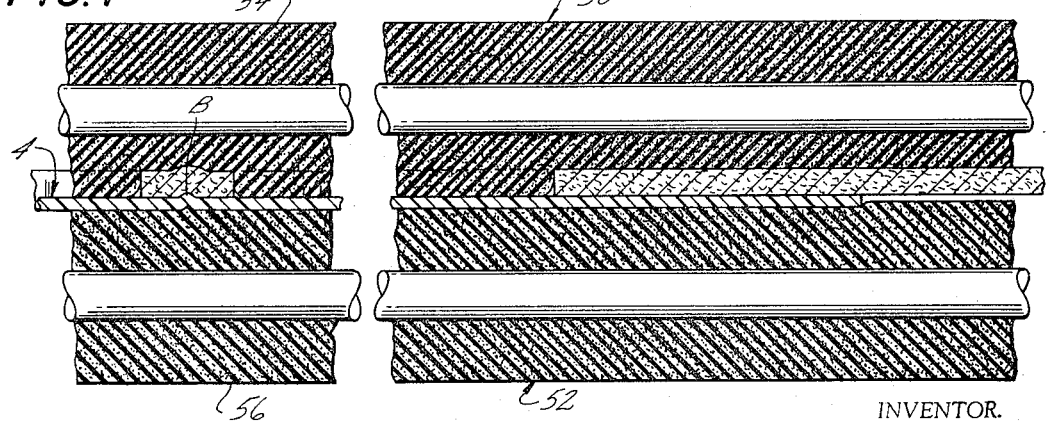
INVENTOR.
CHARLES E. PALMER
BY Peter L. Costas
ATTORNEY Jan. 31, 1967  C. E. PALMER  3,301,143
METHOD AND APPARATUS FOR FOLDING CONTAINERS HAVING
A WINDOW OF SYNTHETIC PLASTIC SHEET MATERIAL
Filed Dec. 26, 1963  3 Sheets-Sheet 3

INVENTOR.
CHARLES E. PALMER
BY
Peter L. Costas
ATTORNEY

United States Patent Office 3,301,143
Patented Jan. 31, 1967

3,301,143
METHOD AND APPARATUS FOR FOLDING CONTAINERS HAVING A WINDOW OF SYNTHETIC PLASTIC SHEET MATERIAL
Charles E. Palmer, Somers, Conn., assignor to Monsanto Company, a corporation of Delaware
Filed Dec. 26, 1963, Ser. No. 333,294
13 Claims. (Cl. 93—36)

The present invention relates to containers and more particularly to a novel method and apparatus for holding containers having a window of semi-rigid plastic sheet material in a frame of relatively rigid sheet material.

In applicant's United States Patent Number 2,954,725, there is disclosed a novel method and apparatus for cold-folding semi-rigid synthetic plastic sheet material which has proven satisfactory for many applications. Although this method has proven highly satisfactory in providing folds in the plastic material with little disfiguration and impairment of the strength of the plastic sheet material, much of the potential for utilization of synthetic plastic material in packaging resides in the use of composite containers having a window of synthetic plastic sheet material together with a frame which may be folded by relatively economical modifications to existing packaging apparatus of high-speed apparatus of similar type.

Another method of folding such semi-rigid synthetic plastic material has been the scoring of the material along the intended fold line to weaken it sufficiently for folding. However, scoring of such material is difficult in that the depth must be closely controlled to prevent excessive weakening.

It is an object of the present invention to provide a relatively simple and economical method for folding window containers having a window of semi-rigid synthetic plastic sheet material which may be operated at high speed and is adaptable to existing carton gluing and folding equipment.

It is also an object to provide such a method for folding window containers which may be utilized with windows extending into three or more wall panels.

Another object is to provide apparatus for folding window containers having a window of semi-rigid synthetic plastic sheet material which is relatively simple and economical and which may be adapted from existing packaging apparatus or by modification of existing types of apparatus during original manufacture thereof.

Still another object is to provide a relatively economical and rapid method and apparatus for providing a semi-assembled container having a window of semi-rigid synthetic plastic sheet material with fold lines formed therein to enable facile erection and which may be flattened substantially for shipment to a packager.

Other objects and advantages will be apparent from the following detailed description and claims and the attached drawings wherein:

FIGURE 3 is a sectional view to an enlarged scale along the line 3—3 of FIGURE 2;

FIGURE 5 is a partially diagrammatic illustration in section of apparatus and the blank of FIGURE 4 in one step of a method embodying the present invention for folding the container of FIGURE 1;

FIGURE 6 is a similar view to an enlarged scale of the next step in the folding method;

FIGURE 7 is a similar view to a reduced scale of another step;

Figure 1:
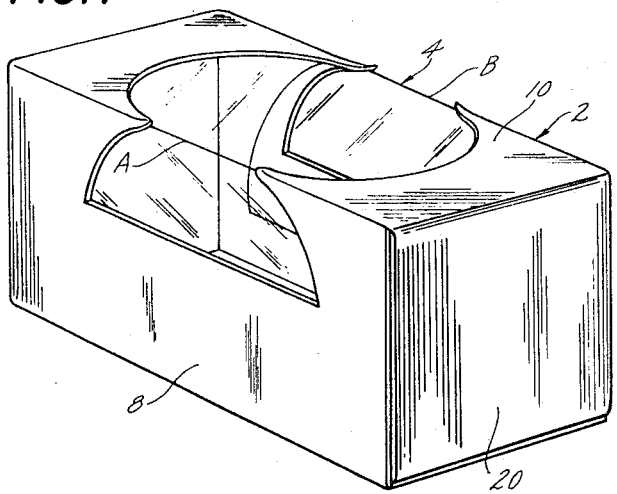
FIGURE 1 is a perspective view of a window container folded in accordance with the present invention.

It has now been found that the foregoing and related objects may be readily attained by a method in which there is just partially folded a blank having a frame of relatively rigid sheet material with a multiplicity of weakening lines therein defining wall panels to provide the sides of the container to be erected therefrom and with a window aperture therein extending across one of the weakening lines into two wall panels and having a window of semi-rigid synthetic plastic sheet material secured to the frame and extending beyond the margins of the window aperture. The partial folding is along one of the pair of weakening lines across which the window extends and is conducted with the window disposed inwardly of the folding so as to fold the window surface over upon itself. The partially folded blank is then further folded between a pair of closely spaced pressure members to flatten and fold the blank substantially completely along the one weakening line and produce a relatively permanent fold line in the window substantially aligned with the one weakening line in the frame. To ensure effective pressure upon the plastic sheet material without excessive destruction of the strength and appearance thereof during the folding, at least one of the pressure members has a resiliently deformable surface.

In folding biaxially oriented sheet materials having a highly stressed skin such as biaxially oriented polystyrene and in folding sheet material of polyvinyl chloride and other polymers exhibiting the ability to take and retain a fold made upon a sharp radius, the folding and flattening should produce a fold with very little or substantially no radius to effect creasing and/or self-scoring of the sheet material. In folding materials such as cellulose acetate and cellulose butyrate which tend to shatter if folded very sharply, the pressure members should be spaced apart slightly more to permit a slight curve or radius at the fold line while effecting the desired 180° fold and substantial flattening of the blank, the pressure nevertheless serving to effect a desired permanent fold line in the material. The spacing and amount of pressure necessary to effect the desired relatively permanent fold line for both types of materials may be readily determined for a desired plastic material by use of a pair of adjustably mounted pressure rollers.

At least one of the pair of pressure members must have a relatively resiliently deformable or compressible surface to assert effective but yieldable pressure upon the window inwardly of the frame, and most desirably both members have such deformable surfaces for optimum operation. In this manner, firm but yielding pressure is ensured upon the window sufficient to avoid excessive injury thereto while imparting the necessary pressure to set or self-score the plastic sheet material along the fold line. Additionally, minor variations in thickness of the materials and/or misalignment can be readily compensated thereby and the deformable material generally will be soft enough and should be kept clean enough to avoid abrading or scuffing the surface of the sheet material. Exemplary of suitable resiliently deformable materials are natural rubber, synthetic rubbers, such as neoprene, and polyurethanes. Provision of deformable surfaces upon both members of the pair is particularly important in folding materials such as cellulose acetate which require a slight radius since sufficient deformability is ensured to effectively eliminate excessive pressures.

Although the pressure members may be movable relative to each other in clamping fashion to operate discontinuously, they preferably are closely spaced rollers into the nip of which the blanks are passed continuously, thus enabling very high speed operation and being adaptable to existing gluing machines.

Although the theory of operation is not fully understood, it is believed that the folding of the relatively rigid frame along its preformed weakening line effectively orients and predetermines the location of the fold in the window if it is held in substantially fixed relationship thereto. In the preferred plastic sheet material which is folded about a sharp radius, the plastic sheet material which is confined by the frame is allowed to determine its own depth of scoring or creasing along the inside surface during the folding, thus leaving the plastic sheet material on the outside surface relatively undisturbed and with substantially the original characteristics. The resiliently deformable surface upon one or both of the pressure members in this folding operation allows the plastic sheet material itself to determine the pressure required to fold and self-score, and the likelihood of excessive pressure and possible destruction of the material is effectively minimized. It has been found that the resultant fold thereafter may be opened and may subsequently be set in the desired 90° angle of fold upon erection of the container while still maintaining a substantial degree of the strength of the material before folding to provide a relatively high strength container. Even the materials such as cellulose acetate which are folded about a small radius rather than developing an actual crease or score line therein exhibit the ability to be returned to a 90° position in the erected container without their exerting excessive pressures upon the frame.

In many machines used for folding and/or gluing cartons, endless belts are used for supporting, transporting and gradually folding the panels, usually in conjunction with a sword or other member internally of the fold to ensure folding along the weakening line. Although the pressure members of the present invention may be provided by a combination of pressure surfaces and endless belts with the pressure surfaces acting in conjunction with and operating against the outside surfaces of one or a pair of such endless belts as they pass therebetween and such belts may be designed and utilized to provide the necessary deformable surface for the pressure members, a pair of pressure rollers with resiliently deformable peripheral surfaces operating directly upon the blank is preferable from control and fabrication standpoints. When the endless belts are utilized in combination for providing the pressure members, the pressure surfaces may be rollers, resiliently mounted guide surfaces or simply a fixed guide surface upon which the belt travels although it is highly desirable that some degree of adjustability be provided in the spacing thereof to accommodate varying thicknesses of blanks and plastic materials of different folding characteristics.

For many containers, it is desirable that the blank or partially erected container be shipped as flat as possible. For example, it is customary to break and prefold the several side wall panels and to glue the body of many containers while leaving the ends thereof open to enable shipment of the semi-assembled container in the flat state. Because of the nature of the semi-rigid plastic sheet material, unfolding thereof after developing the fold line therein to make subsequent folds will result in a tendency for the window to bow outwardly rather than lie flat. Accordingly, the fold in the window is desirably smoothed or flattened by flattening the unfolded blank between a pair of pressure members. Each member most desirably has a resiliently deformable surface to ensure effective but yielding pressure upon the window material, preferably a pair of pressure rollers with rubber-like resilient peripheral surfaces. On occasion, it may be necessary to overfold the window in the opposite direction somewhat beyond the flat position between a pair of contoured pressure members or rollers to ensure its flattening.

Generally, the present invention is most desirably utilized with blanks having a frame with four parallel weakening lines defining four side wall panels providing a tubular body of rectangular cross section and a body locking flap at one side thereof for engagement to the side wall panel at the other end thereof. The frame has a window aperture extending across a pair of weakening lines into three side wall panels and an integrally-formed window extends across the entire window aperture and is overlapped by the frame adjacent the margins of the aperture therein. The partial folding and final folding are first conducted along the one weakening line of the pair through which the window aperture extends which is between the second and third side wall panels spaced from the body locking flap. The blank is then unfolded and preferably flattened along the one weakening line and the fold line in the window. Thereafter, the blank is partially folded and further folded along the other of the pair of weakening lines through which the window aperture extends and also folded along the weakening line between the unwindowed wall panel and adjacent windowed wall panel, and the body locking flap is secured to the wall panel at the other side of the blank. The latter two folds preferably are made in a sequence which will vary dependent upon the location of the window aperture since the first of these folds is that along the weakening line between the first and second side wall panels spaced from the body locking flap, thus enabling the side wall panel at the other end thereof to conceal the locking flap when folded, although the locking flap may be exposed or coextensive with the cooperating side wall panel if so desired so as to permit this fold to be made last. The securing of the body locking flap to the cooperating side wall panel is desirably effected by adhesive as is the practice most widely employed. Generally, the adhesive is placed upon the surface of the body locking flap before it and the adjacent wall panel are folded, thus enabling the application of the adhesive from beneath the travelling blank.

To take advantage of the semi-rigid plastic sheet material of the window in enhancing the strength of the frame due to the weakening thereof occasioned by the window aperture, the window should be secured to the frame along opposed overlapping marginal portions. Generally, adhesion is most easily employed and may be effected by a separate interposed coating of adhesive, or by solvent- or heat-sealing where the plastic sheet material permits. However, since the semi-rigid plastic sheet material is of substantial thickness and rigidity, it is necessary to compensate for the plastic material at the fold line to prevent excessive stresses upon the weakening line of the frame and possible disengagement of the window from the frame.

In applicant's copending United States patent application, Serial Number 191,018, filed April 30, 1962, now Patent No. 3,199,670, and entitled Container and Method of Making Same, there are disclosed a preferred container and blank for high strength containers with a folded window wherein the sides of the window are notched at the ends of intended folds therein coinciding with the weakening lines in the frame and the frame is provided with opposed fingers which project inwardly of the window aperture and overlie the margins of the notches in the window. The window is bonded to the frame along the overlapping side margins but is free from bonding thereto adjacent the notches so that, upon folding, the excess material of the window at the fold line is displaced from the body of the frame and thus is not confined thereby. The projecting fingers of the frame which overlie the window at the fold line are unsupported at their sides and inner ends and thus are relatively weak and deflect outwardly readily under the stress thereon created by the fold in the window material. In this manner, the relative slippage provided by the structure compensates for the differential while continuing to maintain firm bonding between the window and frame for high-strength composite action. During the folding in accordance with the present invention, the plastic sheet material can flex the fingers outwardly against the deformable material of the pressure member.

In applicant's copending United States patent application, Serial Number 300,330, filed August 6, 1963, now Patent No. 3,249,213 and entitled Window Containers and Blanks and Method for Forming Same, there are disclosed another window container and blank of relatively high strength having a folded window therein. In this container and blank, the window is secured to the frame upon only one side of the intended fold line therein or between intended fold lines so as to permit the portions to one side of the fold lines to be free from bonding to the frame. In this manner, the unsecured portion of the window to one side of the intended fold line is free to move relative to and along the inside of the adjacent wall panel of the frame during folding so as to accommodate the thickness of the window material and the depth of scoring used for weakening the paperboard frame. Although the fold line in the window will be displaced somewhat from the fold in the frame, it nevertheless remains in substantial alignment therewith to provide an attractive window container of relatively high strength since the window is secured to one panel of the frame to enhance the strength thereof.

The frame may be readily fabricated from paperboard sheet material of 12 to 50 mils in thickness, which provides ample rigidity for this purpose. Since the paperboard may be dyed or printed readily, wide variations in appearance of the container are possible.

The synthetic plastic sheet material employed for the window should be semi-rigid with sufficient flexibility to accommodate stresses and impacts during normal usage. As previously indicated, the material preferably should be foldable about a sharp radius to develop a score line or crease upon the inner surface such as biaxially oriented synthetic plastic materials having highly stressed skins. Exemplary of such sharply foldable materials are biaxially oriented polystyrene, polyvinyl chloride and polyvinyl chloride-acetate copolymer. However, materials which cannot be so sharply folded may also be employed albeit with greater difficulty in control and operation such as cellulose acetate and butyrate. The most desirable material utilized to date has been biaxially oriented polystyrene of about 4 to 12 mils in thickness because of its clarity, high strength, economy and semi-rigidity coupled with sufficient resiliency and flexibility to provide desirable folds and resistance to normal impacts. However, the suitability and conditions of operation for various plastic materials may be readily determined by a pair of adjustably mounted pressure rollers as previously mentioned.

During the partial folding, the window is held in relatively fixed position with respect to the weakening line in the frame so that it may determine the fold therein. In the preferred window containers using the notches and fingers wherein the window is secured to both sides of the fold line, the engagement between the window and frame is sufficient for this purpose. However, it is desirable to utilize a sword or other guide member against the inside surface of the window to minimize any stresses tending to cause disengagement from the frame. After the window has been folded to about 110° or more, the window will generally retain its orientation with respect to the frame. Before passage of the preferred sharply foldable plastic sheet materials between the pressure members, the sword or guide member should be removed to avoid its interference with the substantial flattening and folding of the sheet material. With the loose panel blanks wherein the window is free from bonding to the frame upon one side of the fold line, the sword or guide member is most desirably utilized during the partial folding to maintain the desired relatively fixed position and minimize shearing of the bond between the window and frame to the other side of the fold line but again should be removed prior to final folding for the preferred sharply foldable materials.

With the materials such as cellulose acetate which are folded about a radius, a sword or other guide member may not only serve to ensure the desired position of the window with respect to the frame but it may also provide a positive limiting element during final folding if thin enough to prevent overflattening of the window and possible shattering of the plastic sheet material.

Referring now in detail to the attached drawings, FIGURE 1 illustrates a window container which may be readily produced in accordance with the present invention and which has a frame of relatively rigid paperboard sheet material generally designated by the numeral 2 and a window of semi-rigid synthetic plastic sheet material generally designated by the number 4. The structure of the container is best understood by reference to the blank of FIGURE 4 from which it is made.

The paperboard frame 2 is integrally formed and provided with four parallel, longitudinally extending weakening or score lines 6a, 6b, 6c, and 6d defining the side wall panels 8, 10, 12 and 14 and the body locking or glue flap 16 at one side thereof which is engaged with the side wall panel 8 in the erected container to form a tubular body of rectangular cross-section. The frame 2 is cut and also provided with parallel, transversely extending weakening or score lines 18 which define end wall panels 20 hingedly connected to the side wall panel 10, dust flaps 22, 24 hingedly connected to the side wall panels 8, 12 and tuck flaps 26 hingedly connected to the ends of the end wall panels 20. The frame 2 has a window aperture 28 therein extending across the weakening lines 6a, 6b into the three side wall panels 8, 10 and 12 and the window aperture 28 is configured so as to provide generally curvilinear fingers 30 extending towards each other at the weakening lines 6a, 6b from the body of the frame 2.

The window 4 is dimensioned to extend beyond the margins of the window aperture 28 so that the marginal portions of the frame 2 about the window aperture 28 overlap the side margins thereof. The window 4 has generally curvilinear notches 32 which are aligned with fingers 30 and dimensioned so that the fingers 30 overlap the surface of the window 4 about the margins of the notches 32.

Interposed between and bonding the overlapping portions of the window 4 and the frame 2 is an adhesive layer 34 which is substantially continuous between the fingers 30 but which terminates adjacent thereto so that the overlapping surfaces of the fingers 30 and the window 4 adjacent the margins of the notches 32 are free from adhesive to permit relative slippage therebetween. When the blank is folded along the weakening lines 6a and 6b, notches 32 displace the bulk of the window material at the folds A, B inwardly of the window aperture from the body portions of the side wall panels 8, 10 but are concealed from external view by the projecting fingers 30 which overlap the margins thereof. In this manner, the excess material of the folds in the plastic window 4 is displaced from the relatively rigid body of the frame 2 although the weakening lines 6a, 6b of the frame 2 serve to orient the folds A, B. Since the projecting fingers 30 are unsupported at their sides and inner ends, they are relatively weak and deflect or bend outwardly quite readily under the stress created by the thickness of the window 4 at the folds A, B. This permits the window 4 to fold easily although substantially confined since the folded portion is permitted limited free movement to spring somewhat outwardly of the inner surface of the body of the frame 2.

Figure 2:
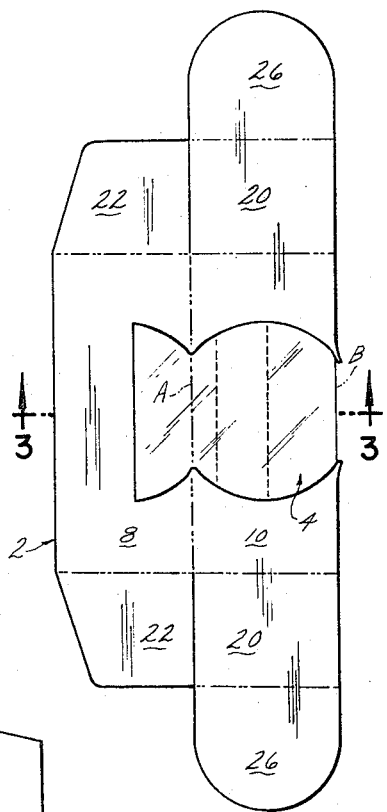
FIGURE 2 is a plan view to a reduced scale of the window container of FIGURE 1 in folded flat position as for shipment to a packager.
Figure 4:
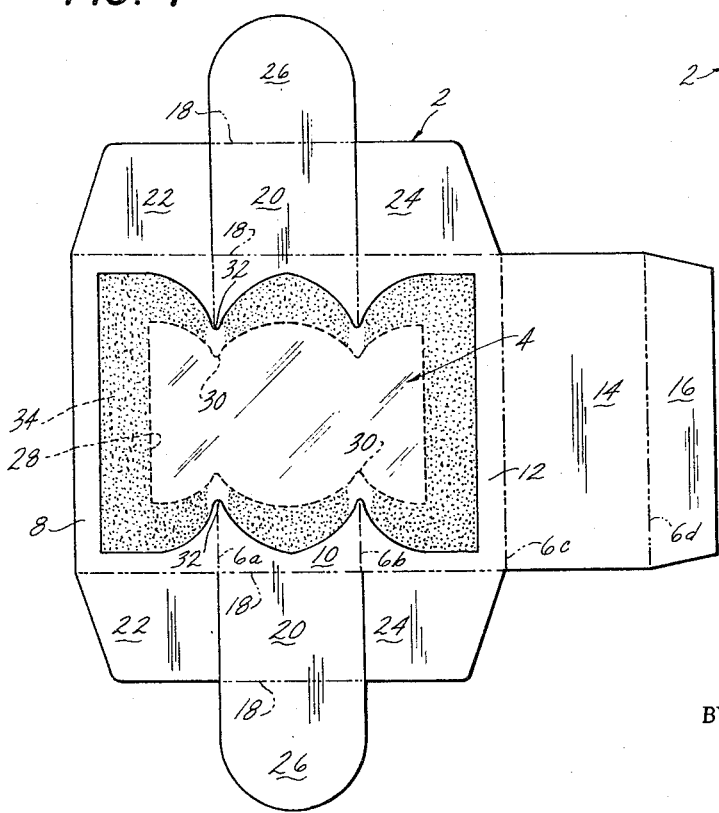
FIGURE 4 is a bottom view to a reduced scale of the blank for the container of FIGURES 1-3.

In erecting the blank of FIGURE 4 for transportation to a packager in a substantially flat state, the body locking or glue flap 16 is adhered to the inside surface of the side wall panel 8 by an interposed layer of adhesive (not shown) and the end wall panels 20, dust flaps 22, 24 and tuck flaps 26 are left in extended, unfolded position as seen in FIGURES 2 and 3. However, to enable facile and satisfactory erection of this partially assembled container, it is necessary to develop the fold lines A, B in the window 4 as well as to pre-break the weakening lines 6a, 6b, and 6c in the frame 2 before shipment to the packager.

Turning now to FIGURES 5–9, therein diagrammatically illustrated is a method and apparatus embodying the present invention for assembling the blank of FIGURE 4 into the partially assembled container of FIGURES 2 and 3. For clarity of illustration, only the essential components of the apparatus in accordance with the present invention are illustarted.

In FIGURE 5, the blank of FIGURE 4 is being carried upon a continuous conveyor system with the window 4 disposed upwardly and suitable means such as the folding belts 36, 38 conventionally employed in high speed gluers have partially folded the blank along the weakening line 6b with the sword or blade 40 acting as a guide. At this point, the window 4 has a relatively wide radius in its bend and would tend to spring outwardly upon release of the pressure thereupon.

In FIGURE 6, the partially folded blank is being passed between a pair of pressure rollers 42, 44 each having a peripheral surface portion 46, 48 of relatively compressible and resilient material such as rubber, polyurethane or the like. The rollers 42, 44 are closely spaced so as to flatten and fold the blank substantially completely along a line substantially aligned with the weakening line 6b in the frame 2 and produce the relatively permanent fold line B in the window 4. The resilient material of the roller surface portions 46, 48 allows the plastic sheet material of the window 4 to determine substantially the folding pressure exerted thereon because of its own resistance to folding and ability to deform the resilient material and ensure effective pressure upon the window 4 internally of the window aperture 28 despite the thickness of the sheet material of the overlying (or underlying) frame 2. The resilient material of the surface portions 46, 48 also allows the fingers 30 to deflect under the pressure of the window 4.

In FIGURE 7, the blank has been unfolded along the weakening line 6b and fold line B by conventional means such as folding belts and fingers. Because of the nature of the plastic sheet material of the window 4, it has retained a tendency to return to a partially folded position which would preclude facile and desirable stacking for shipment. To flatten substantially the blank for shipment along the previously fold line B in the window 4, the blank is passed between a pair of closely spaced pressure rollers 50, 52 having peripheral surface portions 54, 56 of resiliently deformable material. These pressure rollers 50, 52 thus exert effective but compensable flattening pressure upon the window 4 along the fold line B to substantially flatten it although the preformed fold line B remains for rapid erection of the blank into the final container.

Figure 8:
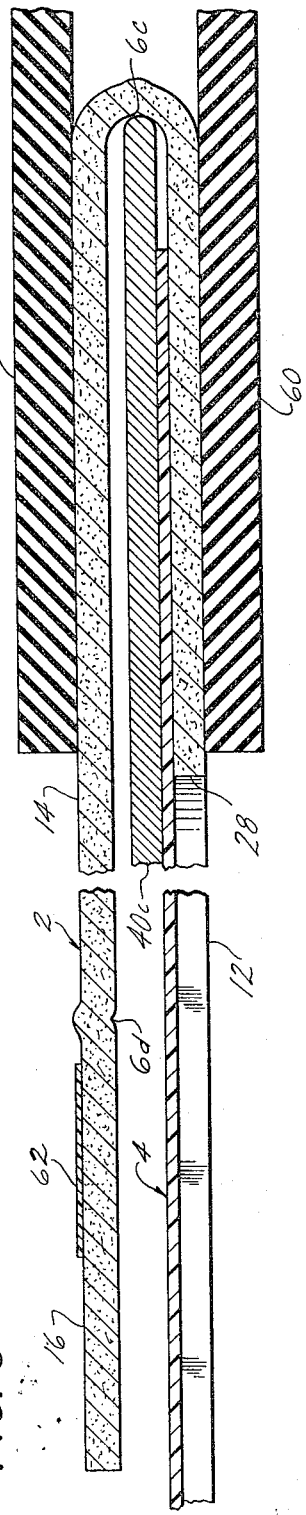
FIGURE 8 is a similar view of still another step.

In FIGURE 8, the frame 2 is being folded by folding belts 58, 60 along the fold line 6c between the unwindowed side wall panel 14 and the adjacent windowed panel 12 with the sword 40c acting as a guide surface. Prior to this folding, a layer of adhesive 62 had been applied to the lower surface of the glue flap 16 by conventional means (not shown).

Figure 9:
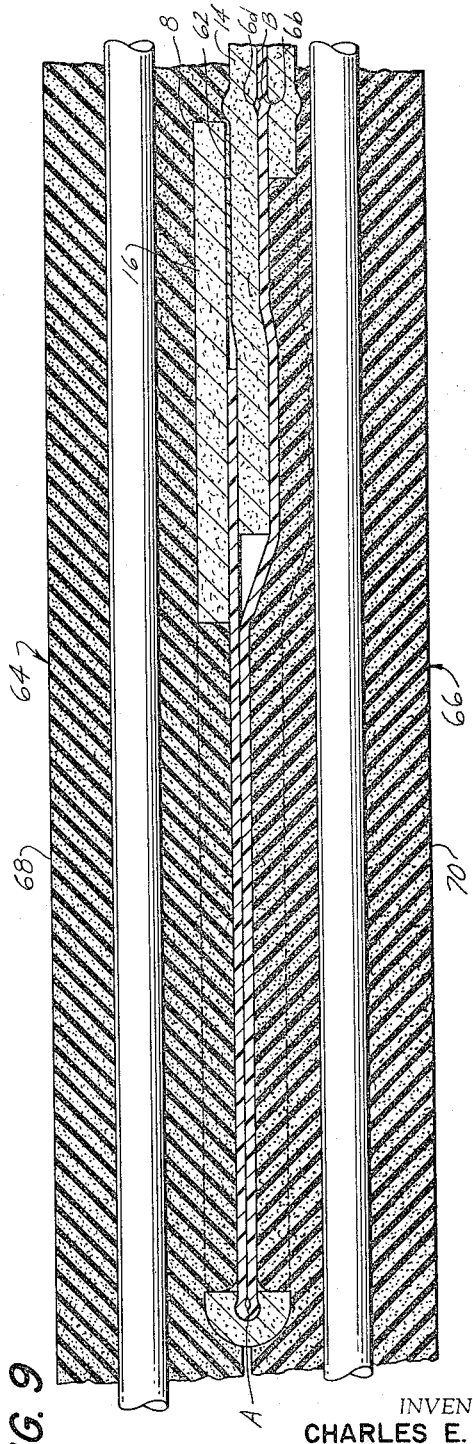
FIGURE 9 is a similar view of the last folding step.

In FIGURE 9, the blank had first been partially folded along the weakening line 6a by folding belts (not shown) as in FIGURE 5 and is now being passed between pressure rollers 64, 66 having peripheral surface portions 68, 70 of resiliently deformable material to effect the permanent fold line A in the window 4 and pre-break the weakening line 6a in the frame 2 in the same manner as FIGURE 6. The side wall panel 8 is adhered to the glue flap 16 by the previously applied adhesive 62 and the tubular body portion and semi-assembled container of FIGURES 2 and 3 has thus been formed with fold lines A, B in the window 4 so as to enable facile erection by the packager or user.

Thus, it can be seen that the prefolded semi-assembled container has been readily and rapidly produced by a method and apparatus which is operable at high speed and adaptable to existing packaging apparatus. However, it will be appreciated that the method and apparatus may be employed for other blank and container configurations and with other means for locking the body and also for producing a flat blank by opening the several folds after forming the same.

Although the method and apparatus have been illustrated with respect to the preferred embodiment of a pair of pressure rollers each having a resiliently deformable surface, it will be appreciated that the technique may be employed with intermittent multistation folding pressure units at lower speeds or with other combinations of pressure members providing the necessary resiliently deformable surface to effect permanent folding without substantial injury to the plastic sheet material or the paperboard frame.

Thus, it can be seen that the present invention provides a relatively simple and economical method and apparatus for folding window containers having a window of semi-rigid synthetic plastic sheet material which may be operated at high speeds for high-speed production lines and optimum economy and which is adaptable to existing carton gluing and folding equipment. The method and apparatus may be used to fold windows extending into three or more side wall panels and to provide semi-assembled window containers which lie substantially flat for shipment to packager or user and which may be easily erected.

Having thus described the invention, I claim:

1. In the method of folding window containers, the steps comprising partially folding a blank having a frame of relatively rigid sheet material with a multiplicity of weakening lines therein defining wall panels to provide the sides of a container to be erected therefrom, said frame having a window aperture therein extending across one of said weakening lines into two of said wall panels and said blank having a window of semi-rigid synthetic plastic sheet material secured to said frame and extending beyond the margins of said window aperture, said partial folding of said blank being along said one weakening line and with said window disposed inwardly of said folding; further folding said partially folded blank between a pair of closely spaced pressure members to flatten and fold said blank substantially completely along said one weakening line, one of said pressure members having a resiliently deformable surface, said flattening and folding producing a relatively permanent fold line in said window substantially aligned with said one weakening line in said frame; unfolding said blank along said one weakening line and fold line; and flattening said unfolded blank between a second pair of closely spaced pressure members along said one weakening line and fold line to flatten substantially said window along said fold.

2. The method of claim 1 wherein said first-mentioned pressure members are pressure rollers having relatively compressible peripheral surfaces.

3. The method of claim 1 wherein said synthetic plastic sheet material is biaxially oriented polystyrene of about 4 to 12 mils in thickness.

4. The method in accordance with claim 1 wherein said second pair of pressure members are rollers with resiliently deformable peripheral surfaces.

5. In the method of folding window containers, the steps comprising partially folding a blank having a frame of relatively rigid paperboard material with a multiplicity of weakening lines therein defining wall panels to provide the sides of the container erected therefrom, said frame having a window aperture therein extending across a pair of adjacent parallel weakening lines into three of said wall panels and said blank having a window of semi-rigid synthetic plastic sheet material secured to said frame and extending beyond the margins of said window aperture, said partial folding of said blank being along one of said pair of weakening lines and with said window disposed inwardly of said folding; further folding said partially folded blank between a pair of closely spaced pressure members to flatten and fold said blank substantially completely along said one weakening line, one of said pressure members having a resiliently deformable surface, said flattening and folding producing a relatively permanent fold line in said window substantially aligned with said one weakening line in said frame; unfolding said blank along said one weakening line and fold line; flattening said unfolded blank between a pair of closely spaced pressure members along said one weakening line and fold line to flatten substantially said window along said fold line; partially folding said blank along the other of said pair of weakening lines with said window disposed inwardly of said folding; and further folding said partially folded blank between a pair of closely spaced pressure members to flatten and fold said blank substantially completely along said other weakening line, one of said pressure members having a resiliently deformable surface, said flattening and folding producing a scored relatively permanent fold line in said window substantially aligned with said other weakening line in said frame.

6. The method in accordance with claim 5 wherein said pairs of pressure members are rollers with resiliently deformable peripheral surfaces.

7. In the method of folding a window container of rectangular cross section, the steps comprising partially folding a blank having a frame of relatively rigid paperboard material with four parallel weakening lines therein defining four side wall panels for providing a tubular body of rectangular cross section and a body locking flap at one side thereof for engagement to the side wall panel at the other side thereof, said frame having a window aperture therein extending across a pair of said weakening lines into three side wall panels and said blank having a window of semi-rigid synthetic plastic sheet material secured to said frame and extending beyond the margins of said window aperture, said partial folding being along the one of said pair of weakening lines between the second and third side wall panels spaced from said body locking flap and with said window disposed inwardly of said folding blank; passing said partially folded blank between a pair of closely spaced pressure rollers to flatten and fold said blank substantially completely along said one weakening line, one of said pressure rollers having a resiliently deformable surface, said flattening and folding producing a relatively permanent fold line in said window substantially aligned with said one weakening line in said frame; unfolding said blank along said one weakening line; partially folding said blank along the other of said pair of weakening lines with said window disposed inwardly of said folding; passing said partially folded blank between a pair of closely spaced pressure rollers to flatten and fold said blank substantially completely along said other weakening line and produce a relatively permanent fold line in said window substantially aligned with said other weakening line, one of said rollers having a resiliently deformable peripheral surface; folding said blank along the weakening line between the unwindowed side wall panel and the adjacent windowed side wall panel; and securing said body locking flap to the side wall panel at the other side of said blank.

8. The method of claim 7 wherein the order of said second-mentioned partial folding and further folding steps and of said last-mentioned folding step is arranged to fold the blank first along the weakening line between the first and second side wall panels spaced from said body locking flap.

9. The method of claim 7 wherein said unfolded blank is passed between a pair of closely spaced pressure rollers along said one weakening line and fold line to flatten substantially said window along said fold line.

10. Apparatus for folding window containers having a window of semi-rigid synthetic plastic sheet material including first partial folding means for folding an associated blank having a frame of relatively rigid sheet material with a multiplicity of parallel weakening lines defining side wall panels and a window of semi-rigid sheet material extending across two adjacent weakening lines into three panels, said means being adapted to partially fold said blank along one of the pair of weakening lines with the window disposed inwardly of the fold; a first pair of closely spaced pressure members for flattening and folding the blank substantially completely along the one weakening line, one of said pair of pressure members having a resiliently deformable surface; means for unfolding the blank; a second pair of closely spaced pressure members to flatten the blank along the fold line; second partial folding means for partially folding the blank along the other of the pair of weakening lines with the window disposed inwardly of the fold; and a third pair of closely spaced pressure members for flattening and folding the blank substantially completely along the other weakening line across which the window aperture extends, one of said pair of pressure members having a resiliently deformable surface.

11. The apparatus of claim 10 wherein each of said pairs of pressure members is comprised of pressure rollers each having a resiliently deformable peripheral surface.

12. Apparatus for folding window containers having a window of semi-rigid synthetic plastic sheet material including first partial folding means for folding an associated blank having a frame of relatively rigid sheet material with four parallel weakening lines defining four side wall panels for providing a tubular body of rectangular cross section and a body locking flap at one side thereof for engagement to the side wall panel at the other side thereof and having a window of semi-rigid synthetic plastic sheet material extending across a pair of adjacent weakening lines into three side wall panels, said partial folding means being adapted to fold the blank along the one of the pair of weakening lines between the second and third side wall panels spaced from the body locking flap and with the window disposed inwardly of the folding blank, a first pair of closely spaced pressure members for flattening and folding the blank substantially completely along the one weakening line, one of said pair of pressure members having a resiliently deformable surface; means for unfolding the blank; a second pair of closely spaced pressure members to flatten the blank along the fold line; second partial folding means for partially folding the blank along the other of the pair of weakening lines with the window disposed inwardly of the fold; a third pair of closely spaced pressure members for flattening and folding the blank substantially completely along the other weakening line across which the window extends, one of said pair of pressure members having a resiliently deformable surface; body folding means for folding the blank along the weakening line between the unwindowed side wall panel and the adjacent windowed side wall panel, the order of said second partial folding means and third pair of pressure members and of said body folding means being arranged to fold said blank first along the weakening line between the first and second side wall panels spaced from the body locking flap; and means for securing the body locking flap to the side wall panel at the other side of the blank.

13. The apparatus of claim 12 wherein each of said pairs of pressure members is comprised of pressure rollers each having a resiliently deformable peripheral surface.

References Cited by the Examiner
UNITED STATES PATENTS

| | | | |
|---|---|---|---|
| 2,143,957 | 1/1939 | Petter | 206—45.34 X |
| 2,589,944 | 3/1952 | Labombarde | 93—52 |
| 2,858,013 | 10/1958 | Vines et al. | 206—45.31 |
| 3,009,200 | 11/1961 | Voigt | 18—14 |
| 3,105,418 | 10/1963 | Talbot et al. | 93—52 X |

FRANK E. BAILEY, *Primary Examiner.*

B. STICKNEY, *Assistant Examiner.*